May 14, 1957 — W. D. HERSHBERGER — 2,792,548
SYSTEMS AND METHODS OF GAS ANALYSIS
Filed May 28, 1945 — 3 Sheets-Sheet 1
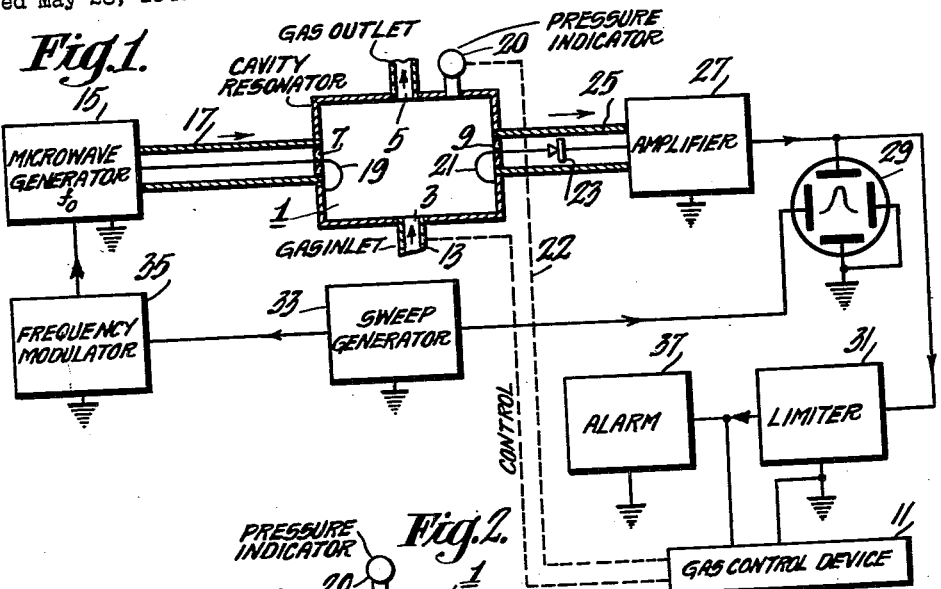
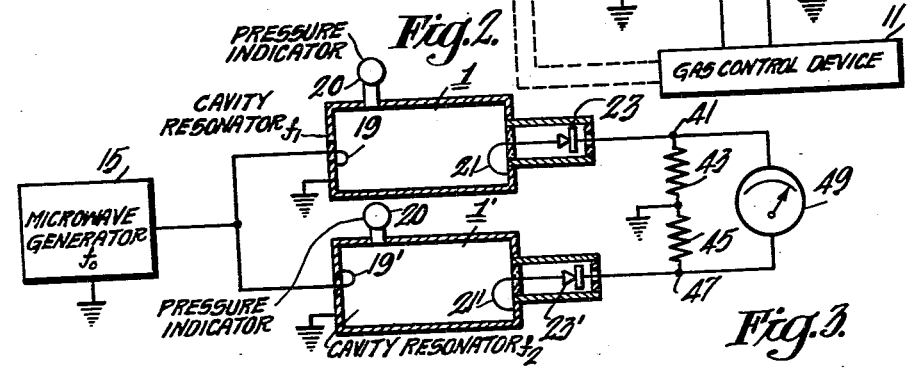
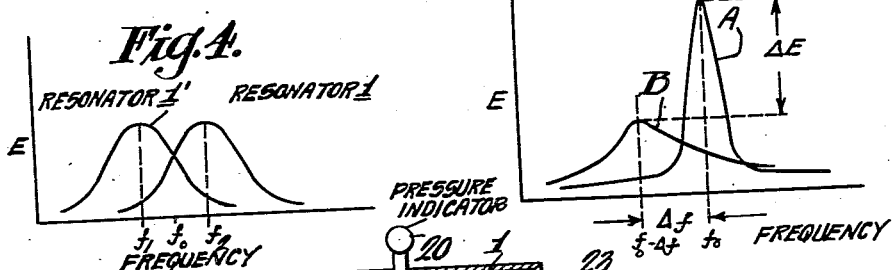
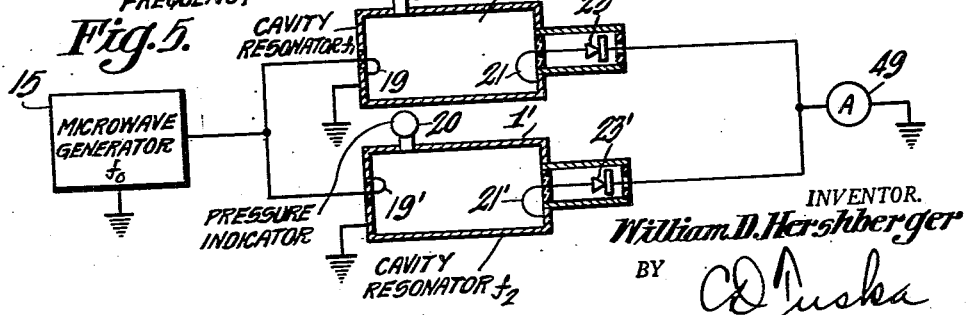
INVENTOR.
William D. Hershberger
BY
ATTORNEY

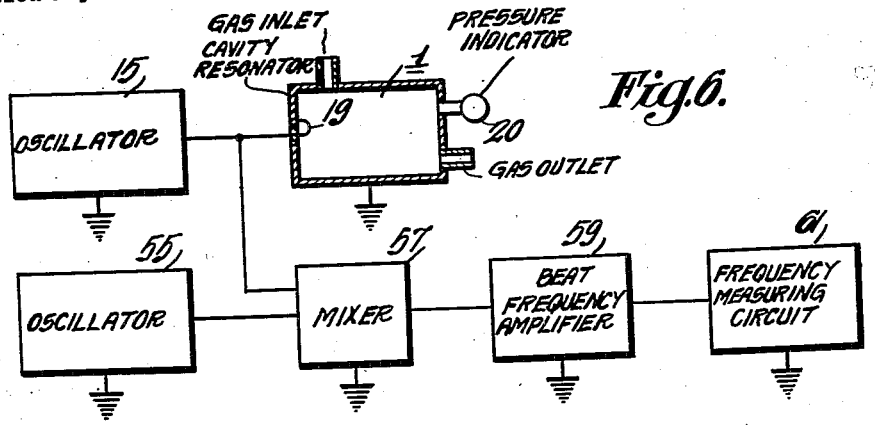
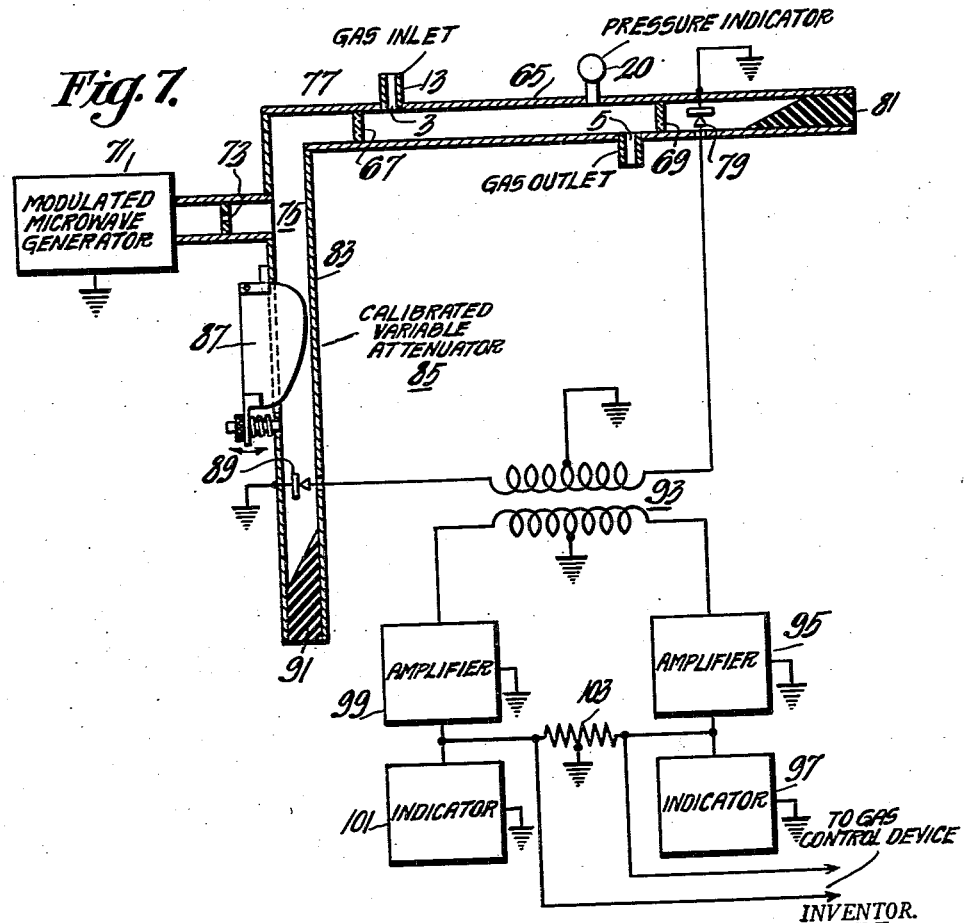

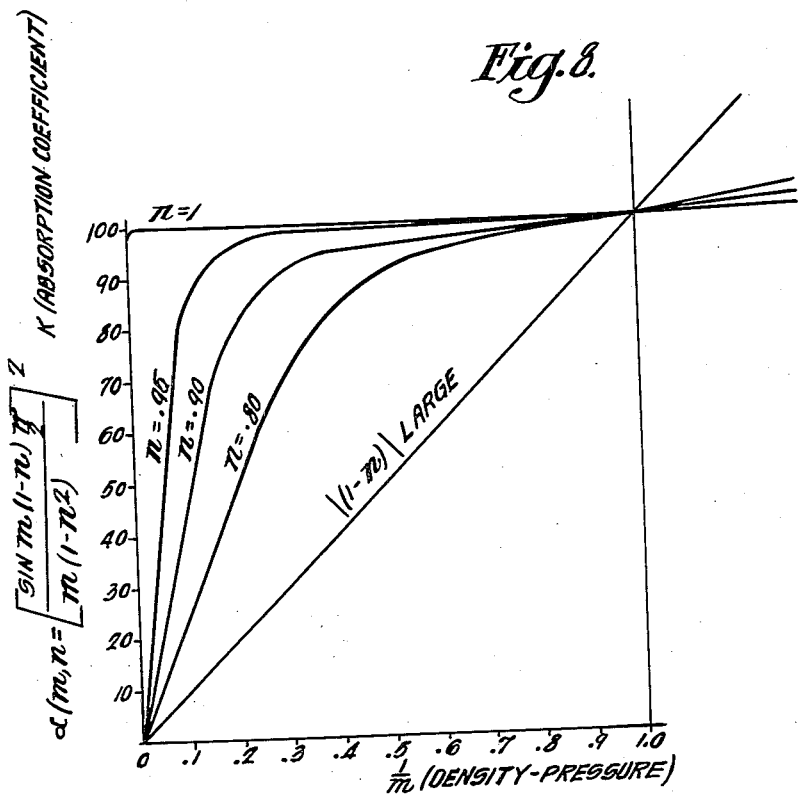

2,792,548

SYSTEMS AND METHODS OF GAS ANALYSIS

William D. Hershberger, Princeton, N. J., assignor to Radio Corporation of America, a corporation of Delaware Application May 28, 1945, Serial No. 596,242

27 Claims. (Cl. 324—58.5)

This invention relates generally to methods of and systems for gas analysis and more particularly to methods and systems employing modulated or unmodulated microwaves for such analyses.

Many gas distillation, cracking and other industrial processes require accurate analyses of various gas components encountered during the various steps of the process. The instant invention contemplates the analysis of gases by determining the selective absorption of such gases or the variation in dielectric constant thereof at constant pressure, or as a function of pressure, for millimeter or centimeter electromagnetic waves. Such gas analysis is extremely useful in monitoring chemical manufacturing processes as well as for indicating operating characteristics or controlling the operation of said processes.

Various gases, both inorganic, such as ammonia ($NH_3$), and organic such as ethyl chloride, have been found selectively to absorb millimeter electromagnetic waves. The microwave absorption characteristic (absorption-coefficient v. frequency), of pure ammonia gas is described in an article by Cleeton and Williams in Physical Review 45, 234 (1934). The presence of ammonia in a mixture of non-absorbing gases may be detected by observing the loss factor or the dielectric constant of the mixture of gases at a frequency in the neighborhood of the frequency for maximum microwave absorption.

This method may be employed for monitoring the production of ammonia by the Haber process. In this process the output of the catalyst chambers is a mixture of ammonia ($NH_3$), nitrogen ($N_2$), and hydrogen ($H_2$). The output mixture is cooled to below $-38.5°$ C. to liquefy the ammonia, while the uncombined $N_2$ and $H_2$ are again compressed to 1000 atmospheres and raised in temperature to about 600° C., thereby necessitating great expenditure of energy.

Thus, it is highly desirable to determine the ammonia concentration before refrigeration. For this simple process, a continuous sample of the gas mixture may be caused to flow continuously through a cavity resonator having definite size and Q. The resonant frequency of the cavity resonator and its Q are measured with an air dielectric or when evacuated. The presence of the microwave-absorptive gas mixture provides a two-fold effect (1) a change in the resonant frequency of the gas-filled resonator, and (2) a drop in its Q. The magnitude of these effects depends upon the percentage of ammonia which is present. Either or both effects may be employed to warn an operator that the percentage of ammonia in the mixture is above or below predetermined marginal limits. Also, either or both effects may be employed to control the temperature, pressure, rate-of-flow, or proportions of the gas components in a continuous control process.

Heretofore, gas production processes have required the taking of occasional samples of the gases for chemical or spectroscopic analyses. Such analyses require considerable time, and often also require that the production process be interrupted until the analysis is completed, thus necessitating considerable unnecessary delay and expense. It is emphasized that the instant method and process provides continuous analysis of any desired portion of the production process, thereby permitting either manual or automatic control of the production process when the gas components vary between predetermined marginal limits.

When more complicated gaseous mixtures are involved, such as in the manufacture of butadiene in synthetic rubber production, there is always a possibility of the production of gases other than those desired. Observations by means of the instant system at a variety of frequencies on the loss-factor and the dielectric constant of the mixture of gases as a function of gas pressure may be necessary to determine the composition of the mixture. However, these observations may be made continuously by means of separate cavity resonators supplied by gases at different points in the process, and energized at different microwave frequencies, thus providing continuous monitoring and control.

Various methods and systems may be employed for the microwave analysis of such gaseous mixtures. For example, a first embodiment of the invention comprises a frequency-modulated microwave generator coupled into a cavity resonator through which the unknown gases flow continuously. A microwave detector coupled to the cavity resonator provides currents proportional to the microwave transmission therethrough. These currents may be applied to the vertical ray deflecting elements of a cathode ray oscilloscope, and the modulation frequency may be applied to the horizontal ray deflecting elements thereof, thus providing an indication of the transmission characteristics of the gas as a function of the microwave frequency spectrum of the frequency-modulated waves.

A second embodiment of the invention utilizes two cavity resonators tuned to slightly different frequencies in the neighborhood of the output frequency of a microwave generator. The cavity resonators and the microwave generator are tuned to frequencies in the neighborhood of the frequency for maximum absorption of the particular microwave absorptive gas to be analyzed. Microwave detectors coupled to each of the cavity resonators are connected to an indicator circuit which indicates the difference in output from the two detectors to measure the dielectric constant of the gas, or, alternately, indicates the sum of the outputs of the two detectors to measure the loss factor of the gas.

A third embodiment of the invention employs a cavity resonator through which the gas to be analyzed is passed continuously and irradiated by microwaves. The resonator comprises the frequency-controlling circuit of the variable frequency microwave generator. The output of the variable frequency generator is combined with the output of a similar constant frequency generator to provide a beat-frequency signal. The frequency of the beat-frequency signal is a measure of the dielectric constant and hence of the composition of the gases passed through the cavity resonator.

A modification of the first embodiment of the invention employing a balanced indicator circuit of high sensitivity utilizes a modulated microwave generator for irradiating a continuously flowing sample of the gas passing through a relatively long section of waveguide. The microwave energy passing through the absorptive gas mixture is detected by a first microwave detector and applied to one terminal of a balanced circuit. The modulated microwave generator also is connected to a second waveguide system including a calibrated microwave attenuator and a second microwave detector. The second microwave detector is connected to the remaining terminal of the balanced detector circuit. By adjustment of the calibrated microwave attenuator, a perfect balance of the detector outputs may be obtained, providing a null indication. The variable attenuator may be calibrated in terms of loss-factor or of percentage of the microwave absorptive gaseous component. The balanced indicator circuit may be employed in addition alternately for controlling the rate-of-flow, the pressure, the temperature or the proportions of the gaseous mixture being analyzed.

Among the objects of the invention are to provide an improved method of and means for analyzing gaseous mixtures. A second object of the invention is to provide an improved method of and means for detecting microwave absorptive gases. Another object is to provide improved methods of and means for indicating the proportions of microwave absorptive components of a gaseous mixture. An additional object is to provide improved methods of and means for measuring the loss-factor of a microwave absorptive gas as a function of gas pressure and frequency. A further object is to provide improved methods of and means for measuring the dielectric constant of gases as a function of gas pressure and frequency. Another object is to provide improved methods of and means for continuously analyzing the composition of a gaseous mixture. An additional object is to provide improved methods of and means for controlling the temperature, pressure, rate-of-flow, or composition of a gaseous mixture in response to microwave analysis of said mixture.

Another object is to provide improved methods of and means for analyzing microwave absorptive gaseous mixtures by employing said gaseous mixture to control the frequency of a microwave generator, and thence by measuring the frequency-shift of said generator as a function of different characteristics of said gases. An additional object is to provide improved methods of and means for analyzing gaseous mixtures by comparing the loss-factor of said mixture for microwave irradiation with known microwave attenuation in a balanced network.

The invention will be described in greater detail by reference to the accompanying drawings of which Figure 1 is a schematic circuit diagram of a first embodiment of the invention, Figure 2 is a schematic circuit diagram of a second embodiment of the invention, Figure 3 is a family of graphs illustrative of the loss-factor and dielectric-constant change in a resonator containing microwave absorptive gases in the presence of microwave irradiation, Figure 4 is a family of graphs indicating the resonant characteristics of the cavity resonators of the circuits of Figures 2 and 5, Figure 5 is a schematic circuit diagram of a modification of the second embodiment of the invention shown in Figure 2, Figure 6 is a schematic circuit diagram of a third embodiment of the invention, Figure 7 is a schematic circuit diagram of a modification of the first embodiment of the invention illustrated in Figure 1, and Figure 8 is a family of graphs showing the relations between microwave absorption, frequency and gas pressure for all gases. Similar reference characters are applied to similar elements throughout the drawings.

Referring to Figure 1 of the drawings a cavity resonator 1, having a gas inlet port 3 and a gas outlet port 5, includes microwave permeable windows 7 and 9 for enclosing a gaseous mixture which includes microwave absorptive gas components. A gas control device 11, connected to the gas inlet line 13, controls the temperature, rate-of-flow, pressure, or composition of the gas in any known manner in response to control potentials, described hereinafter. The gas control device may include any desired combination of manual or automatic thermostats, pressure regulators, needle valves, mixing jets, flow meters, separately or differentially operable upon the gas supply system in a manner known in the art. A microwave generator 15, having a carrier frequency $f_0$, is coupled to the cavity resonator 1 through a coaxial line 17 terminated in a coupling loop 19 disposed within the resonator 1. The microwave generator carrier frequency $f_0$ is selected to be of the order of the frequency of maximum microwave absorption of the gaseous mixture to be analzed. Similarly the resonator including the microwave absorptive gas dielectric should preferably be tuned initially to the same frequency. The gas pressure may be indicated by means of a conventional pressure gauge 20, or by a pressure responsive device indicated by the dash line 22 to the control device 11.

A second coupling loop 21 within the resonator 1 is coupled, through a microwave detector 23 and a second coaxial line 25, to the input of an amplifier 27. The output of the amplifier 27 is connected to the vertical deflecting electrodes of a cathode-ray oscilloscope 29 and to the input of a voltage limiter 31.

A sweep-frequency generator, or other source of low-frequency voltage, 33 having an output frequency, for example, of 100 cycles, is connected to the horizontal deflecting electrodes of the cathode-ray oscilloscope 29, and also is connected through a frequency modulator network 35 to modulate the carrier frequency $f_0$ of the microwave generator 15. Preferably, the frequency-shift of the microwave carrier frequency $f_0$ provided by the frequency modulation should be between relatively wide values.

Thus microwave absorptive gases either confined within or passed through the resonator 1 absorb microwave energy to a greatest extent at the frequency of maximum microwave absorption thus reducing the Q of the resonator at this frequency. Also the resonant frequency of the resonator 1 will be determined by the dielectric constant of the gaseous mixture confined within or passed through said resonator. Therefore, as the frequency $f_0$ is modulated by the sweep frequency, a resonance curve of the resonator characteristics will be provided on the cathode-ray oscilloscope 29. The output of the limiter circuit 31, being responsive to the output of the amplifier 27, may be employed to actuate an alarm 37, or to actuate the gas control device 11, or both, when the composition of the gas under analysis exceeds predetermined marginal upper or lower limits, or both, depending upon the characteristics of the limiter circuit 31. Upper and lower, or combination upper and lower voltage value limiter circuits are well known in the television and wave shaping arts. The control potentials derived from the limiter may be detected or rectified before application to subsequent indicator or control devices, if desired.

Figure 3 shows a graph A of the resonance characteristic of the resonator 1 with an air dielectric, or for an evacuated resonator. Graph B shows the drop $\Delta E$ in voltage output with a microwave-absorptive gaseous dielectric. The frequency shift $\Delta f$ is due to the variation in dielectric constant between the air dielectric and the microwave-absorptive gaseous dielectric. Thus the graph B is typical of the response for a typical resonator having a predetermined microwave-absorptive gaseous dielectric. Either the voltage differential $\Delta E$ or the frequency differential $\Delta f$, or both, may be employed for controlling the alarm or the gas control device in any manner well known in the art.

Alternatively, the heating of the microwave-absorptive gas within the resonator due to its selective absorption of microwave energy may be employed for analyzing the gas composition by utilizing the thermometric type of energy detector described in applicant's copending application Serial No. 537,960, filed May 29, 1944, which provides an indication characteristic of the change in pressure in the resonator due to the heating effect upon the microwave absorptive gas of the irradiating microwaves. Any other type of heat or pressure detector, either mechanical or electrical, might be substituted to provide the desired indications.

Another means of indicating gas composition might utilize optical refraction due to microwave irradiation of the microwave absorptive gas as disclosed in applicant's copending application Serial No. 540,428, filed June 15, 1944. For any of the methods or systems described herein the essential information for obtaining the gas analysis is found in the relations between absorption-coefficient and frequency, or between dielectric-constant and frequency, at constant known pressure, or as a function of gas pressure.

Figure 2 shows a circuit for utilizing two gas-filled cavity resonators 1 and 1' tuned, respectively, to slightly higher and to slightly lower frequencies $f_2$ and $f_1$ than the frequency $f_0$ for the maximum microwave absorption of the gas to be analyzed. The microwave generator 15 is coupled into the first cavity resonator 1 by means of a first coupling loop 19 and is also coupled into the second cavity resonator 1' by means of a second coupling loop 19'. The output coupling loop 21 in the first cavity resonator 1 is coupled through a first microwave detector 23 to one end terminal 41 of a resistive network comprising serially-connected resistors 43 and 45. The output coupling loop 21' in the second cavity resonator 1' is coupled through a second microwave detector 23' to the remaining output terminal 47 of the resistive network 43, 45. The common terminal of the resistors 43 and 45 is grounded. An indicator 49, which if desired, may include amplification, is connected between the resistor terminals 41 and 47, whereby the difference of the output voltages of the two microwave detectors 23 and 23' is obtained.

This difference voltage indication is a function of the dielectric constant of the microwave absorptive gas. Since, as shown in the graphs of Figure 4, as the tuning of the cavity resonators 1 and 1' is changed due to variation in dielectric constant of the gas enclosed therein, the output energy of one resonator will increase while the output energy of the other resonator will decrease. Since the indication provided by the indicator 49 is a function of the difference of the detector output voltages, the sensitivity of the system is better than that obtainable by means of a single cavity resonator.

The circuit illustrated in Figure 5 is similar to that of Figure 2, with the exception that the output voltages of the microwave detectors 23 and 23' are additively applied to the indicator 49. Thus, since the indicator 49 is responsive to the total output of the two detectors, its indications are a measure of the energy-loss, or change in Q, of the resonators due to the microwave absorption in the gaseous mixture therein.

It should be understood that a system of the type described by reference to Figure 2 may be combined with a system of the type described by reference to Figure 5 whereby an indication or control voltage may be obtained which is a function of both variation in dielectric constant and variation in loss-factor due to the microwave irradiation of the gaseous mixture. Such general types of dual-control systems are well known in the art and need not be described in detail herein.

The circuit of Figure 6 illustrates means whereby the variation in dielectric constant of a cavity resonator enclosing microwave absorptive gases may be employed to vary and to control the frequency of a first microwave oscillator 15, a portion of the output energy of which is coupled into the resonator 1 by means of an input coupling loop 19. The resonator 1 is connected to the oscillator circuit in a manner whereby its tuning controls the output frequency of the oscillator. A second, substantially constant-frequency, microwave oscillator 55 is connected to a mixer circuit 57 which also is connected to the output of the first microwave oscillator 15, whereby a beat-frequency signal is obtained and is applied through a beat-frequency amplifier 59 to a frequency measuring circuit 61. Thus indications derived from the frequency measuring circuit 61 are characteristic of the variation in dielectric constant of the microwave absorptive gas within the cavity resonator 1.

Figure 7 is a broad-frequency-band modification of the circuit of Figure 1 adapted to continuous measurement of the loss-factor of a gaseous mixture passing through a section of a wave-guide system. The gases to be analyzed are confined to a predetermined length 65 of a waveguide system by means of microwave permeable windows 67 and 69. A modulated microwave generator 71 is connected through a suitable matching aperture device 73 to a T junction 75 of the waveguide system. One branch 77 of the T junction carries the microwaves to the gas analyzing portion 65 of the waveguide system whereby the gas is microwave irradiated through the window 67. Microwaves transmitted through the microwave absorptive gas, and through the window 69, are detected by means of a first microwave detector 79. The end of the waveguide system adjacent the microwave detector 79 is terminated by means of a matching dielectric plug 81 in a manner well known in the art.

The remaining branch 83 of the T junction of the waveguide system is connected through a calibrated variable waveguide attenuator 85, comprising for example, a rotatable vane 87 of energy absorptive material such as graphite on polystyrene, selectively penetrating into the waveguide through a longitudinal slot in the center of one of the wide faces thereof. The attenuator should provide a minimum of wave reflections back to the generator and to the other waveguide arm 77 from the T junction. The output of the calibrated variable attenuator 85 is coupled to a second microwave detector 89 and is terminated by means of a second matching dielectric plug 91.

The first and second microwave detectors 79 and 89 are connected to the end terminals of a balanced network 93, the center terminal of which is grounded. One end terminal of the network 93 is connected through a first amplifier 95 to a first indicator 97. The other end terminal of the network 93 is connected through a second amplifier 99 to a second indicator 101. The outputs of both amplifiers 95 and 99 may be combined in a resistive network 103 which may be connected to a gas control device or alarm as shown in the circuit of Figure 1. The presence of the separate amplifiers and indicators is to provide indications of the sense as well as the value of the unbalance between the outputs of the two microwave detectors 79 and 89. If the calibrated variable attenuator is adjusted to provide a null indication on the two indicators 97 and 101, the energy loss in the microwave absorptive gas column in the waveguide portion 65 will be balanced by the attenuation of the variable attenuator arm of the bridge. Thus the calibration of the variable attenuator, or the calibrations of the indicators 97 and 101, or both sets of calibrations, may be arranged to indicate directly the loss-factor or the desired gas composition or operating characteristics at a given pressure, or as a function of pressure.

*The effect of gas pressure on microwave absorption*

In considering the effect of gas pressure upon the foregoing methods and systems for gas analysis, the factor of prime importance in determining the width of a special line in the microwave frequency range is the limitation placed on the length of a wave train absorbed by a molecule by intermolecular collisions. An impact or collision theory may be employed which assumes that a molecule absorbs (or emits) a sharp frequency $f_0$ during the time between collisions, and that each collision stops the radiation process completely. In applying Fourier integral methods to determine the spectral distribution corresponding to an interrupted sine wave train, many workers in this field have neglected the term involving $(f_0+f)$ in the denominator in comparison to the term involving $(f_0-f)$, because line width is assumed to be small with respect to line frequency. This procedure is not justified when the collision frequency and the operating frequency are of the same order of magnitude so both terms are included in the following analysis.

The frequency spectrum of a cosine wave train symmetrically placed with respect to the time origin and consisting of $m$ half-periods is first considered. The frequency is $f_0 = \omega_0/2\pi$. The Fourier transformation of interest is $$(1) \quad g_1(\omega) = \frac{1}{\sqrt{2\pi}} \int_{-\frac{m\pi}{2\omega_0}}^{\frac{m\pi}{2\omega_0}} \cos \omega_0 t e^{-i\omega t} dt = \frac{A}{\omega_0}\sqrt{\frac{2}{\pi}} \frac{\cos \frac{mn\pi}{2}}{1-n^2}$$

where $n = \omega/\omega_0$, $A$ is the amplitude of the cosine wave train, and $m$ is integral and odd.

On the other hand, for a sine wave train of amplitude $A$ symmetrically placed with respect to the time origin and with $m$ even and integral, it is noted that $$(2) \quad g_2(\omega) = -\frac{jA}{\omega_0}\sqrt{\frac{2}{\pi}} \frac{\sin \frac{mn\pi}{2}}{1-n^2}$$

The amplitude spectrum for this wave train is $$(3) \quad \frac{A}{\omega_0}\sqrt{\frac{2}{\pi}} \frac{\sin \frac{mn\pi}{2}}{1-n^2}$$

As an interpolation formula, employ $$(4) \quad g(\omega) = \frac{A}{\omega_0}\sqrt{\frac{2}{\pi}} \frac{\sin m(1-n)\pi/2}{1-n^2}$$

where $m$ is no longer restricted to integral values. $g_1(\omega)$ and $g_2(\omega)$ are special cases of $g(\omega)$.

Since $m$ is proportional to the time between collisions, both pressure and density are proportional to $1/m$. The assumptions involved in the present treatment are embodied in setting the absorption coefficient $\alpha$ proportional to $[g(\omega)/m]^2$, that is, $$(5) \quad \alpha(m,n) = B\left[\frac{\sin m(1-n)\frac{\pi}{2}}{m(1-n)^2}\right]^2$$

where $B$ is a constant involving quantum numbers, dipole moments, a Boltzmann factor giving the fraction of the total number of molecules capable of absorption any given temperature, and universal constants. It is to be emphasized that for any given pressure, $m$ is to be considered not as a constant but as lying in a range of values determined from kinetic theory considerations. $m/2$ is the ratio between the operating frequency $f$ and the molecular collision frequency $f_c$, that is $m = 2f/f_c$. $n$, however, is the ratio between operating frequency $f$ and the proper frequency of the molecular $f_0$, that is $n = f/f_0$. In plotting $\alpha$ against $1/m$ for large values of $(1-n)$, a difficulty is encountered owing to the fact that zeroes occur in $g(\omega)$ for certain critical values of $m$. This happens at low pressures but is without physical significance, owing to the character of $m$. The situation here is quite unlike that found, for example, when a single sharply tuned electric circuit is used as an analyzer to explore a frequency spectrum such as $g(\omega)$, in which case the zeroes found at certain critical frequencies are physically significant.

Figure 8 is a family of curves obtained by plotting $\alpha$ against pressure by assigning various values to $n$. The location of the knee in the curve is given very nearly by $1/m = 5/2(1-n)$ which occurs when $$(6) \quad \frac{f}{f_0} = 1 - \frac{f_c}{5f}$$

By the use of this expression the proper frequency of the molecule may be determined when only the operating frequency and the collision frequency are known at the pressure for which a knee occurs on the experimental curve. In applying the above expression, a second difficulty is encountered owing to uncertainty in the value to assign to collision frequency for this kind of process.

In considering experimental data for ammonia at both 1.25 and 3.2 cms., if $3 \times 10^9$ times per second is considered as a plausible value for $f_c$ when $f = 2.4 \times 10^{10}$ cycles per second, it is found that $n$ is very nearly equal to 0.97. Thus it is seen that operation is within a few percent of the proper molecular frequency.

The conclusion that one may safely draw in spite of any uncertainties in the assumed value of $f_c$ is that when a knee occurs in the absorption curve at a relatively low pressure the operating frequency is quite close to the proper molecular frequency. A linear relationship between absorption and density indicates that the operating frequency is well removed from the proper molecular or resonant frequency.

As indicated heretofore, a pressure gauge or other gas-pressure-responsive device may be employed to indicate the operating pressure or to control directly or differentially, in any known manner, the operating characteristics of the gases under analysis. Also the absorption or dielectric constant indicating devices may have a plurality of calibrations for selected pressures or pressure ranges in order that the pressure function may be included in direct indications of gas composition. Any desired combined functions of absorption, dielectric constant, pressure and frequency may thus be included in complex indicator calibrations for analyzing directly the compositions of complex gaseous mixtures.

Since the frequency selectivity of the absorption by gases of irradiating microwaves increases with decreasing pressure, separation of the spectral lines of a number of microwave gas components in a gaseous mixture will be facilitated by operating the gas-filled cavity resonator 11 at relatively low pressures. However, the sensitivity of the indications is reduced as the pressure is decreased. Therefore, an optimum pressure or pressure range must be selected for the particular measurements contemplated in view of the power limitations of the microwave generator and the sensitivity of the measuring circuits.

Thus the invention disclosed comprises several methods of and means for analyzing the composition of gaseous mixtures having at least one microwave absorptive gaseous component. The system is adaptable for gas analysis of individual gas samples or of continuous analysis of a gas column. Separate or combined measurements of microwave loss-factor and of dielectric constant of the gases to be analyzed are provided for operating indicators, alarms, or marginal gas control apparatus.

I claim as my invention:

1. Apparatus for analyzing the composition of mixed gases having a microwave energy absorptive component including a conduit for said gases having inlet and outlet connections, microwave means for irradiating said gases in said conduit, means for measuring the microwave energy transmission through said conduit, means for modulating the frequency of said microwave irradiation, and means for indicating said microwave energy transmission through said conduit as a function of said modulation frequency for determining the proportion of said microwave absorptive component of said gaseous mixture.

2. Apparatus for analyzing the composition of mixed gases having a microwave energy absorptive component including a conduit for said gases having inlet and outlet connections, microwave means for irradiating said gases in said conduit, means for measuring the microwave energy transmission through said conduit, means for modulating the frequency of said microwave irradiation, and cathode ray oscilloscopic means for indicating said microwave energy transmission through said conduit as a function of said modulation frequency for determining the proportion of said microwave absorptive component of said gaseous mixture.

3. Apparatus for analyzing the composition of mixed gases having a microwave energy absorptive component including a pair of cavity resonators filled with said gas and tuned respectively to slightly higher and slightly lower frequencies than the maximum microwave absorption frequency for said gaseous component, microwave means for irradiating said gas in said resonators at said maximum absorption frequency, separate microwave energy detecting means coupled to each of said resonators, and current indicating means coupled additively to both of said microwave energy detecting means for measuring the microwave energy loss in said gas for determining the proportion of said microwave absorptive gas component of said gaseous mixture.

4. Apparatus for analyzing the composition of mixed gases having a microwave energy absorptive component comprising a conduit for a continuous flow of said gases, a modulated microwave generator, means including a microwave permeable window in said conduit for coupling said microwave generator to the gas in said conduit for irradiating said gas, a first microwave detector, means including a second microwave permeable window in said conduit for coupling said first detector to said conduit to derive currents characteristic of the microwave transmission through said conduit, a second microwave detector, a variable microwave attenuator coupling said second detector to said microwave generator, a balanced circuit connecting said first and said second detectors, indicating means coupled to said balanced circuit, and means for adjusting said variable attenuator to provide an energy balance in said balanced circuit whereby the adjustment of said attenuator may be calibrated to indicate the proportion of said microwave absorptive gas component of said gaseous mixture.

5. Apparatus for analyzing the composition of mixed gases having a microwave energy absorptive component comprising a conduit for a continuous flow of said gases, a modulated microwave generator, means including a microwave permeable window in said conduit for coupling said microwave generator to the gas in said conduit for irradiating said gas, a first microwave detector, means including a second microwave permeable window in said conduit for coupling said first detector to said conduit to derive currents characteristic of the microwave transmission through said conduit, a second microwave detector, a variable microwave attenuator coupling said second detector to said microwave generator, a balanced circuit connecting said first and said second detectors, separate amplifying means coupled to each phase of said balanced circuit, indicating means coupled to said amplifying means, and means for adjusting said variable attenuator to provide an energy balance in said balanced circuit whereby the adjustment of said attenuator may be calibrated to indicate the proportion of said microwave absorptive gas component of said gaseous mixture.

6. Apparatus for analyzing the composition of mixed gases having a microwave energy absorptive component comprising a conduit for a continuous flow of said gases, a modulated microwave generator, means including a microwave permeable window in said conduit for coupling said microwave generator to the gas in said conduit for irradiating said gas, a first microwave detector, means including a second microwave permeable window in said conduit for coupling said first detector to said conduit to derive currents characteristic of the microwave transmission through said conduit, a second microwave detector, a variable microwave attenuator coupling said second detector to said microwave generator, a balanced circuit connecting said first and said second detectors, indicating means coupled to said balanced circuit, means for adjusting said variable attenuator to provide an energy balance in said balanced circuit whereby the adjustment of said attenuator may be calibrated to indicate the proportion of said microwave absorptive gas component of said gaseous mixture, and means responsive to said balanced circuit for controlling said gases.

7. An electric circuit arrangement comprising a plurality of electromagnetic energy-guiding paths, means for causing microwave energy to divide equally between said paths, a molecularly resonant gas in one of said paths, means following said gas for obtaining the difference between the energy in the gas-containing path and the energy in another path, a load circuit, and means for supplying said energy difference to said load circuit.

8. A microwave system comprising a microwave oscillator, a chamber containing gas exhibiting selective absorption at microwave frequencies, means including a sweep generator for repeatedly varying the frequency of said oscillator over a range including a selective-absorption frequency of said gas, means for demodulating the microwave energy transmitted through said gas chamber, and translating means having input circuits upon which are respectively impressed electrical pulses from said sweep generator and electrical pulses from said demodulating means.

9. A control system comprising a microwave generator, two paths for transmission of microwave energy produced by said generator, demodulators respectively responsive to microwave energy transmitted by said paths, a chamber included in one of said paths in advance of the corresponding demodulator and containing gas exhibiting molecular resonance at a frequency within the range of said generator, and a network in which the outputs of said demodulators are combined to produce a control signal dependent in sense and value upon said demodulator outputs.

10. A method of analyzing the composition of mixed gases having a microwave energy absorptive component comprising irradiating said gases by microwaves, measuring the microwave energy loss, measuring the frequency of said microwave irradiation, indicating said microwave energy loss as a function of the measured frequency for determining the proportion of said component, modulating the frequency of the microwave irradiation, and controlling the indication in response to the frequency modulation.

11. Apparatus for analyzing the composition of mixed gases having a microwave energy absorptive component including a conduit for said gases having inlet and outlet connections, microwave means for irradiating said gases in said conduit, means for measuring the microwave energy loss in said gas, means for measuring the frequency of said microwave irradiation, means for indicating said microwave energy loss in said gas as a function of said measured frequency for determining the proportion of said microwave absorptive component of said gaseous mixture, means for modulating the frequency of said microwave irradiation, and means for controlling said indicating means in response to said frequency modulation.

12. A method of analyzing the composition of a gas mixture having at least one microwave energy absorptive component which comprises confining a body of the gas mixture at low pressure for which there occurs one or more knees in the absorption/frequency curve of said mixture, each of said knees indicating close correspondence between a molecular resonance frequency of the gas and an impressed microwave frequency, irradiating the confined gas mixture by microwave energy, and varying the frequency of said energy for indicating characteristic data of said gas mixture as a function of the microwave energy absorbed by the gas mixture and the frequency of said energy.

13. A microwave arrangement comprising a microwave oscillator, a chamber containing gas at low pressure for which the absorption/frequency characteristic of said gas has a knee indicative of close correspondence between a molecular resonance frequency of the gas and an impressed microwave frequency, and means coupling said oscillator to said chamber to effect control of the oscillator frequency by variation with frequency of the absorption of microwave energy by said gas.

14. A microwave arrangement comprising a microwave oscillator, a chamber confining at low pressure a gas exhibiting molecular resonance at a frequency in the generation range of said oscillator, and a wave transmission path between said oscillator and said chamber for transmitting to the gas microwave energy generated by said oscillator and for re-transmitting over said same path a control effect to said oscillator from said gas for effecting control of the frequency of the generated oscillations.

15. Apparatus for analyzing the composition of mixed gases having a microwave energy absorptive component including a conduit for said gases having inlet and outlet connections, microwave means for irradiating said gases in said conduit, means for measuring the dielectric constant of said gas, means for measuring the frequency of said microwave irradiation, and means for indicating said dielectric constant of said gas as a function of said measured frequency for determining the proportion of said microwave absorptive component of said gaseous mixture.

16. Apparatus for analyzing the composition of mixed gases having a microwave energy absorptive component including a pair of cavity resonators filled with said gas and tuned respectively to slightly higher and slightly lower frequencies than the maximum microwave absorption frequency for said gaseous component, microwave means for irradiating said gas in said resonators substantially at said maximum absorption frequency, separate microwave energy detecting means coupled to each of said resonators, and differential current indicating means coupled between said microwave energy detecting means for indicating the variation in dielectric constant of the gas in said resonators in response to said microwave irradiation for determining the proportion of said microwave absorptive component of said gaseous mixture.

17. Apparatus for analyzing the composition of mixed gases having a microwave energy absorptive component including a pair of cavity resonators filled with said gas and tuned respectively to slightly higher and slightly lower frequencies than the maximum microwave absorption frequency for said gaseous component, microwave means for irradiating said gas in said resonators substantially at said maximum absorption frequency, two microwave energy detecting means respectively individually coupled to said resonators, and indicating means coupled to both of said detecting means for response to their joint outputs.

18. Apparatus for analyzing the composition of mixed gases having a microwave energy absorptive component including a pair of cavity resonators filled with said gas and tuned respectively to slightly higher and slightly lower frequencies than the maximum microwave absorption frequency for said gaseous component, microwave means for irradiating said gas in said resonators substantially at said maximum absorption frequency, two microwave energy detecting means respectively individually coupled to said resonators, and indicating means coupled to both of said detecting means for indicating the variation in loss factor of the gas in said resonators in response to said microwave irradiation for determining the proportion of said microwave absorptive component of said gaseous mixture.

19. A method of determining variations in a gas mixture of the proportion of a component having a spectral line in the microwave frequency range which comprises introducing two bodies of said mixture into cavities respectively resonant at frequencies slightly higher and slightly lower than the microwave frequency corresponding with said spectral line, irradiating the gas mixture in said cavities with microwave energy in a range of frequencies including said spectral-line frequency, detecting the microwave energies respectively transmitted by said bodies of the gas mixture in said cavities, and applying the detected energies to indicating means jointly to effect response thereof.

20. A method as in claim 19 in which the detected energies are applied differentially to effect response of said indicating means to variations of the dielectric constant of the gas mixture.

21. A method as in claim 19 in which the detected energies are applied cumulatively to effect response of said indicating means to variations of the absorption coefficient of the gas mixture.

22. A method of monitoring a process involving production of gas which comprises continuously passing the gas through a chamber, continuously irradiating the gas in passage through said chamber with microwave energy of frequency in the region for which a component of the gas exhibits molecular resonance, continuously utilizing an effect of such molecular resonance to effect a change of said microwave energy, and measuring such change for continuous analysis of the gas during flow thereof.

23. A method as in claim 22 in which the gas is continuously passed through two chambers respectively resonant at frequencies higher and lower than the molecular resonance frequency of said component, in which the absorptive effect of molecular resonance is utilized to affect the transmission of the microwave energy through the chambers, and in which the algebraic sum of the transmitted energies is measured.

24. A method as in claim 23 in which the difference of the transmitted energies is measured in continuous determination of the dielectric constant of the gas.

25. A method as in claim 23 in which the sum of the transmitted energies is measured in continuous determination of the loss factor of the gas.

26. A method as in claim 22 in which the chamber comprises the frequency-controlling circuit of the microwave generator, in which the effect of the molecular resonance is to vary the frequency of the microwave energy with change of gas composition, and in which the frequency changes are measured in continuous determination of variations of the dielectric constant of the gas.

27. The method of treating a substance which comprises: successively exposing said substance to electromagnetic energy of a plurality of wavelengths longer than about .1 millimeter, said wavelengths including a critical wavelength, characteristic of the nature of said substance in its molecular form, at which a strongly selective absorption of said energy occurs; and determining said critical wavelength to identify said substance.

References Cited in the file of this patent

UNITED STATES PATENTS

| | | |
|---|---|---|
| 1,726,721 | Schullstrom | Sept. 3, 1929 |
| 1,877,810 | Chamberlain | Sept. 30, 1932 |
| 2,020,847 | Mitereff | Nov. 12, 1935 |
| 2,099,687 | Hartig | Nov. 23, 1937 |
| 2,124,029 | Conklin | July 19, 1938 |
| 2,169,174 | Ziebolz et al. | Aug. 8, 1939 |
| 2,222,450 | Frost | Nov. 19, 1940 |
| 2,297,393 | Deserno | Sept. 29, 1942 |
| 2,323,675 | Rand | July 6, 1943 |
| 2,386,830 | Wright | Oct. 16, 1945 |

OTHER REFERENCES

Physical Review for February 15, 1934, pages 234 to 237.

Ph. D. Thesis entitled "Ammonia Absorption Measurements etc." by H. S. Howe, submitted to University of Michigan 1940.

Reprint from Proc. of the I. R. E., vol. 33, No. 4, April 1945, pp. 245–254.